(12) United States Patent
Hognaland

(10) Patent No.: US 9,220,356 B2
(45) Date of Patent: Dec. 29, 2015

(54) ROTATING DEVICE FOR RECEIVING AND HANDLING GOODS

(75) Inventor: Ingvar Hognaland, Nedre Vats (NO)

(73) Assignee: Jakob Hatteland Logistics AS, Nedre Vats (NO)

( * ) Notice: Subject to any disclaimer, the term of this patent is extended or adjusted under 35 U.S.C. 154(b) by 0 days.

(21) Appl. No.: 13/818,289

(22) PCT Filed: Aug. 23, 2011

(86) PCT No.: PCT/NO2011/000230
§ 371 (c)(1),
(2), (4) Date: Mar. 28, 2013

(87) PCT Pub. No.: WO2012/026824
PCT Pub. Date: Mar. 1, 2012

(65) Prior Publication Data
US 2013/0181586 A1    Jul. 18, 2013

(30) Foreign Application Priority Data
Aug. 24, 2010 (NO) .................................. 20101181

(51) Int. Cl.
| B65G 1/133 | (2006.01) |
| B65G 1/137 | (2006.01) |
| B65G 47/76 | (2006.01) |
| B65G 47/82 | (2006.01) |
| A47F 5/025 | (2006.01) |

(52) U.S. Cl.
CPC ................ *A47F 5/025* (2013.01); *B65G 1/133* (2013.01); *B65G 1/1378* (2013.01)

(58) Field of Classification Search
None
See application file for complete search history.

(56) References Cited

U.S. PATENT DOCUMENTS

| 2,626,702 A | 1/1953 | Basus |
| 2,701,065 A | 2/1955 | Bertel |
| 2,760,620 A | 8/1956 | Hull et al. |
| 3,306,426 A | 2/1967 | Arnold et al. |
| 3,406,727 A * | 10/1968 | Rexus ............................ 141/131 |
| 4,003,461 A | 1/1977 | Speaker et al. |
| 4,609,309 A * | 9/1986 | Aralt ............................... 406/56 |
| 4,756,429 A | 7/1988 | Lehman et al. |
| 5,147,176 A | 9/1992 | Stolzer et al. |
| 6,015,040 A | 1/2000 | Goeb et al. |
| 7,077,619 B2 * | 7/2006 | Corrigan .................... 414/744.4 |
| 2009/0205520 A1 * | 8/2009 | Schafer et al. ................ 101/216 |

FOREIGN PATENT DOCUMENTS

| CN | 1154334 A | 7/1997 |
| DE | 198 50 636 A1 | 5/2000 |
| EP | 0 767 113 B1 | 7/2002 |

(Continued)

OTHER PUBLICATIONS

Notice of Reasons for Rejection in corresponding Japanese Application No. 2013-525858 mailed Apr. 21, 2015 (10 pages).

(Continued)

*Primary Examiner* — Kavel Singh
(74) *Attorney, Agent, or Firm* — Osha Liang LLP

(57) ABSTRACT

A rotating device for receiving and handling goods or products, where the device has a number of holding devices designed for receiving storage devices, where the holding devices are rotatable about a central axis in the rotating device by a common drive arrangement, where at least one holding device with a received storage device is made available to an operator, while at least one other holding device is made available for receiving a storage device.

10 Claims, 5 Drawing Sheets

(56) References Cited

FOREIGN PATENT DOCUMENTS

| EP | 1 739 017 A1 | 1/2007 |
|---|---|---|
| JP | 56-136722 A | 10/1981 |
| JP | 01-288523 A | 11/1989 |
| WO | 9818696 A1 | 5/1998 |

OTHER PUBLICATIONS

Office Action in corresponding Chinese Patent Application No. 201180040885.2 mailed Jan. 6, 2014, with translation (12 pages).

English Translation of Abstract for CN1154334A, publication date Jul. 16, 1997 (1 page).

International Search Report issued in PCT/NO2011/000230 mailed Dec. 1, 2011 (3 pages).

International Preliminary Report on Patentability issued in PCT/NO2011/000230 mailed Sep. 19, 2011 (4 pages).

Response to Written Opinion and Search Report of the International Searching Authority issued in PCT/NO2011/000230 mailed Dec. 1, 2011, dated Aug. 24, 2012 (6 pages).

Norwegian Search Report issued in Patent No. 20101181 dated Mar. 24, 2011 (1 page).

* cited by examiner

ROTATING DEVICE FOR RECEIVING AND HANDLING GOODS

CROSS-REFERENCE TO RELATED APPLICATIONS

The present application is a national stage application of PCT/NO2011/00230 filed Aug. 23, 2011, which claims priority to Norwegian Patent Application No. 20101181, filed Aug. 24, 2010. The priority application is hereby incorporated by reference in its entirety.

BACKGROUND

1. Field of the Invention

One or more embodiments of the present invention relates to a device for receiving and handling goods or products, and more particularly to a rotatable device for input and output of goods or products in a storage system.

2. Description of Related Art

In today's society, both privately and in the business sector, the consumption of goods is increasing at a great rate. A number of producers and commercial organizations have therefore adopted different storage systems for their goods and/or products. Because manual retrieval of goods and/or products in such a storage system is time-consuming considering that a single customer order might comprise a large number of different goods and/or products, storage systems of this kind are more or less automated. The storage installations are computer-controlled, with a number of robots being employed for finding and retrieving the various goods and/or products. The retrieved goods and/or products are delivered to receiving stations in the storage system, whereupon an operator will pack the goods and dispatch them according to the individual customer's orders.

Different kinds of automation are previously known of such stores, especially for retrieval of units from a store of this kind. In American U.S. Pat. No. 5,147,176 an automated storage system is described, where goods items are assigned a random position in the system, and where a computer program keeps a continuous record of the individual goods items' position in the system. The storage system further comprises storage shelves, where the stored goods items are arranged in storage boxes in the storage shelves. Between the storage shelves access passages will be provided, and cranes or hoisting devices will then transfer the storage boxes to wagons which will transport them to a packing station.

Another storage system is described in the European patent EP 767.113 B1, where a robot system is employed for placing or removing goods items in or from the storage system. The goods items are arranged vertically in stacks, and a robot can lift the goods items vertically by means of a gripping device in order to remove them from the stack.

U.S. Pat. No. 2,701,065 describes a system for handling and storing containers holding various products and/or goods. The containers are arranged in vertical columns or stacks. Two separate hoisting devices are employed in order to retrieve a single container from a column or stack. The container will then be delivered to a receiving and handling station, whereupon products and/or goods can be transferred to a vehicle.

The above storage system has made the retrieval process of the various goods items faster and more efficient, while reducing errors in the retrieval of the goods items. However, the storage systems will be of such a nature that a "bottleneck" will be created at the storage systems' packing stations or delivery stations, thereby causing delays in the packing of the goods items, because the systems will only be able to deliver one storage container at a time to a packing station or delivery station. When the operator has picked out the relevant goods item from the storage container, the storage container will be returned to the storage shelf or stack by means of the robot, crane or hoisting device, whereupon a new storage container is produced and delivered at the packing station or delivery station. This process is repeated until all the goods items have been picked out and packed ready for dispatch.

SUMMARY

Consequently one or more embodiments of the present invention provides a rotating device for receiving and handling goods and/or products which can receive and handle goods and products in such a storage system in a faster and more efficient manner.

One or more embodiments of the present invention provides a rotating device for receiving and handling goods and/or products which is compact and therefore takes up very little space.

Further features of one or more embodiments of the present invention will become apparent from the dependent claims and the description below.

One or more embodiments of the present invention relates to a rotating device for receiving and handling different goods and products, where the rotating device is provided in a work station which is associated with a storage system for different goods and products. The rotating device comprises a number of holding devices which are designed for receiving storage devices, where each holding device is connected via a frame to an elongated element which is mounted in the centre of the device. Drive devices are further connected to each frame, where these drive devices are further connected to a common drive arrangement, in order thereby to provide a rotation of the holding devices about a central axis extending parallel to the elongated element.

The common drive arrangement and the drive devices may comprise one or more electric motors, wheels etc., where gearwheels, belt drive etc. may be employed to provide a rotation of the holding devices. Furthermore, on account of the design of the common drive arrangement and drive devices, it will be possible for the holding devices to be rotated independently of or dependently on one another. A person skilled in the art will understand how this arrangement should be designed in order to achieve the desired purpose.

The rotating device may, for example, comprise three holding devices, but it should be understood that the device may be provided with a greater or smaller number of holding devices. The number of holding devices will be dependent on the storage system "capacity", i.e. how many different goods items the storage system contains, anticipated turnover of the different goods items, etc.

The holding devices in the rotating device according to one or more embodiments of the present invention are preferably arranged to be rotated independently of one another. If the rotating device comprises three holding devices, for example, this will permit that two holding devices may be arranged in the actual storage system, thereby enabling both the holding devices to be "served" simultaneously; if both the holding devices in the storage system are empty (i.e. a storage device is not provided in the holding device), robots can fetch storage devices for each of the two holding devices simultaneously. If one of the holding devices located in the storage system is empty while the other is full (i.e. a storage device is provided in the holding device), one robot can fetch a storage device in order to place the storage device in the empty holding device, while another robot can retrieve the storage device from the full holding device and place the storage device in the storage system. At the same time, while the robots are delivering to or fetching from the two holding devices located in the storage system, an operator can pick goods or products from the third holding device which is then located in the work station.

It should be understood, however, that the holding devices may also be arranged to be rotated dependently on one another.

The holding device in the rotating device may, for example, be composed of an open box (the box is without a top and bottom) or a frame of beams. The holding device may furthermore have a rectangular shape and is adapted to suit standardized storage devices. It should be understood, however, that the holding device may be of a different shape, such as square, circular or the like.

According to an embodiment of the rotating device, the holding devices are designed to be able to rotate about a central axis extending through the centre of the holding device.

On an inside of the holding devices there may be provided at least one stop device and/or a sensor device for the storage devices, in order thereby to be able to secure and/or receive a confirmation that a storage device has been received in the holding device.

In one or more embodiments of the present invention the rotating device for receiving and handling goods and products is mounted on and connected to a framed structure, which in turn is mounted in a work station. The framed structure may furthermore comprise a framework which will be adapted to suit the dimensions (width, length and height) of the storage system's framework, in order thereby to facilitate the delivery and retrieval of storage devices to and from the holding devices.

It should be understood, however, that the rotating device may be mounted directly in the work station, without being connected to a framed structure. A non-limiting description will now be given of embodiments of the present invention with reference to the accompanying drawings.

DETAILED DESCRIPTION

Embodiments of the invention are described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
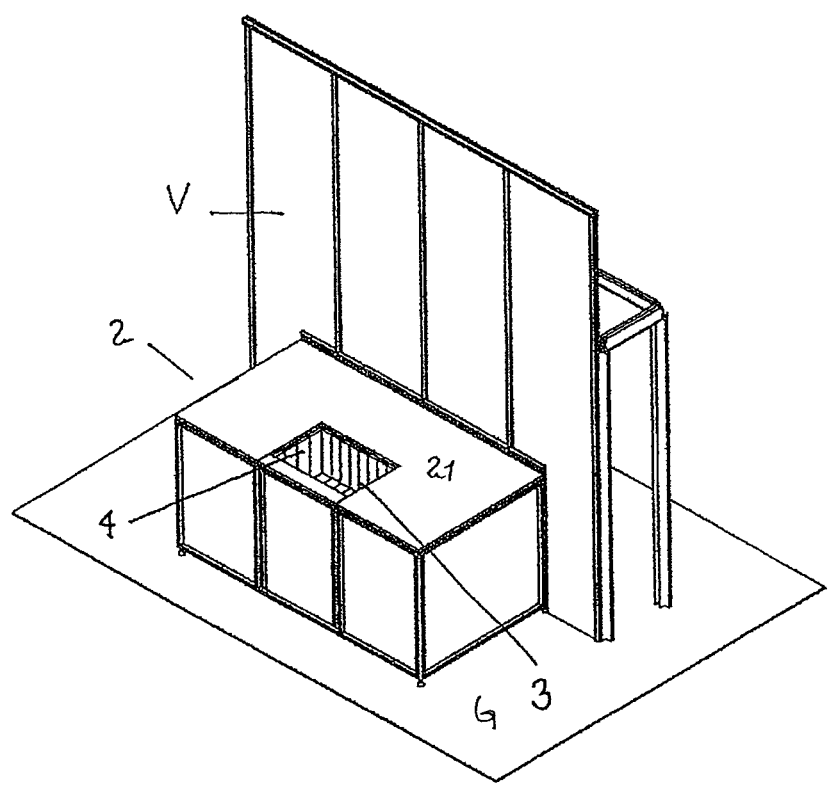
FIG. 1 illustrates a rotating device according to one or more embodiments of the present invention mounted in a work station in a storage system.

In FIG. 1 a rotating device 1 according to one or more embodiments of the present invention is mounted in a work station 2, which work station 2 is associated with a storage system for different goods and/or products. The actual storage system for the different goods and/or products is not illustrated, but may, for example, be composed of a large number of standardised containers or storage devices 4 which are arranged in a vertical framework. The stock of goods in the form of homogeneous or heterogeneous units will then be arranged in the individual containers. By means of a computer and control program a number of robots (not shown) will be able to retrieve containers holding goods and/or products according to a customer order from the storage system's framework and deliver the retrieved container(s) or storage device(s) 4 at the work station 2.

The work station 2 comprises a working surface 21, in which working surface 21 there is provided an opening 3 for receipt and delivery of goods and/or products. A storage device 4 in the rotating device 1 is shown partly through the opening 3.

When one or more goods or products (not shown) according to a customer order are retrieved from the storage device 4 by an operator, the operator will rotate the rotatable device 1 by means of a control device (not shown), with the result that the next storage device 4, which is already retrieved by a robot, is passed to the opening 3 in the working surface 21. The storage device 4 with the already selected item and/or product will then be "fed" into the storage system again in a similar manner, thereby enabling a robot to fetch the storage device 4 and place it at a random location in the storage system's framework. The design and mode of operation of the rotating device 1 will be explained in more detail below.

Figure 2:
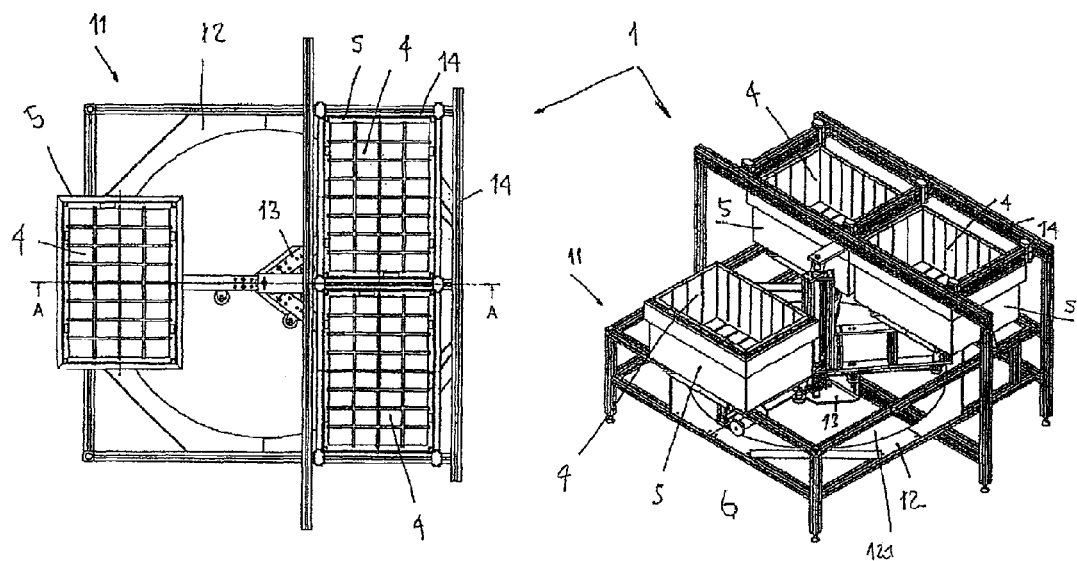
FIG. 2 illustrates the device according to one or more embodiments of the present invention partly from the side and from above.

FIG. 2 illustrates an embodiment of the rotating device 1 according to one or more embodiments of the present invention, where the rotating device 1 comprises three holding devices 5. In each of the holding devices 5 there is provided a storage device 4. A holding device 5 may, for example, be an open "box" (without top and bottom), see FIG. 3, where a number of stop devices (not shown) may be mounted on an inside of the holding device 5. The stop devices will prevent the storage devices 4 from "sliding" through the holding device 5. In addition a detector device (not shown) may be provided in the form of a sensor on the inside of the holding device 5, for confirming that a storage device 4 has been received and secured in the holding device 5.

A person skilled in the art will know how stop and sensor devices should be arranged in order to achieve the intended effect, and it will therefore not be further described here.

Each holding device 5 is further connected to a holding plate 6, which holding plate 6 is supported by a vertically arranged frame 7. One short side of the vertically arranged frame 7 is connected to an elongated element 8, while a drive device 9 is provided and connected to an opposite short side of the vertically arranged frame 7. The drive device comprises a wheel 10.

The elongated element 8 comprises an upper and lower mounting bracket 80, which is used for mounting the elongated element 8 on a central stem 140. In this case the mounting brackets 80 are provided with a through-going hole.

The lower end of the central stem 140 is connected to a common drive arrangement (not shown), to which common drive arrangement the drive devices 9 are connected.

A storage device 4, holding device 5, holding plate 6 and the vertically arranged frame 7 will therefore form a separate unit 100 in the rotating device 1, where each separate unit 100 can be controlled independently of the two other units. The separate units 100 are furthermore mounted in a framed structure 11, where a plate 12 is mounted in the framed structure 11 at a height above a base G, for example a floor, on which the rotating device is placed. The plate 12 is provided with a through-going hole 121, where the circumference of the through-going hole 121 is used for controlling the units in the device 1. The wheel 10 in each unit's 100 drive device 9 will then be arranged to be able to follow the circumference of the through-going hole 121.

When the separate units 100 are mounted in the framed structure 11, the elongated elements 8 will be arranged in towards the centre of the rotating device 1, where the elongated elements 8 are supported by a plate element 13 via their lower end 81. The plate element 13 is further connected to a cross beam 1 11 in the framed structure 11. The elongated elements S will furthermore be connected to each other and a supporting beam 112 via their upper ends 82.

The separate units 100 are further connected via their drive devices 9 to a common drive device (not shown) for the rotating device 1. The common drive device may, for example, be an electromotor or the like, where the drive device is arranged to be able to drive the separate units 100 independently of one another.

The rotating device 1 for receiving and handling goods and/or products is employed with a storage system in order to further increase the speed of selecting and delivering goods or products stored in the storage system. One or more robots will then be able to select storage devices 4 in the storage system's framework according to a customer order, where each storage device 4 contains a goods item or a product. The one or more robots will then deliver the storage device 4 in an empty holding device 5 in the rotating device 1.

In FIG. 2 two of the rotating device's 1 holding devices 5, in which holding devices 5 two storage devices 4 are arranged, will be arranged in the actual storage system for different goods and products. A framework 14, which forms a part of the framed structure 11, will then be adapted to suit the storage system's framework (not shown). The holding devices 5 and the storage devices 4 will then be located behind a wall V in FIG. 1.

When a robot in the storage system has delivered a storage device 4 in an empty holding device 5 in the rotating device 1, an operator will arrange by means of a control device for the rotating device 1 to be rotated about an axis of rotation extending parallel to the elongated elements 8, thereby causing the holding device 5 containing the storage device 4 to be brought to the opening 3 in the work station 2.

The operator can now pick out through the opening 3 the goods item or items located in the storage device 4 in order to pack it or them. While the operator is picking out the goods item or items from the storage device 4, another robot will have found another storage device 4 in the storage system and will have delivered this storage device 4 in an empty holding device 5 in the rotating device 1, where the empty holding device 5 is located in the actual storage system (behind the wall V).

When he or she has picked out the goods item or items from the first storage device 4, the operator will again arrange for the rotating device 1 to be rotated, whereupon the new storage device 4 delivered in the holding device 5 is rotated towards the opening 3 in the work station 2. This rotation will also have caused the first holding device 5 with the storage device 4 to be rotated into the storage system again. While the operator picks out one or more goods items from the second storage device 4, a robot will be able to retrieve the first storage device 4 (from which the operator has already picked out a goods item or items), so that the storage device 4 can again be stored in the storage system's framework, while at the same time another robot will be able to find a third storage device in the storage system. The third storage device 4 will then be delivered in the empty holding device 5 in the device 1. When he or she has picked out one or more goods items from the second storage device 4, the operator will then once again arrange for the rotating device 1 to be rotated, whereby the third storage device 4 is brought to the opening 3 in the work station 2.

The process of retrieval and delivery of storage devices 4 in the rotating device's 1 holding devices 5 and the storage system is repeated until the goods item or items in a customer order have been selected and packed.

Figure 3:
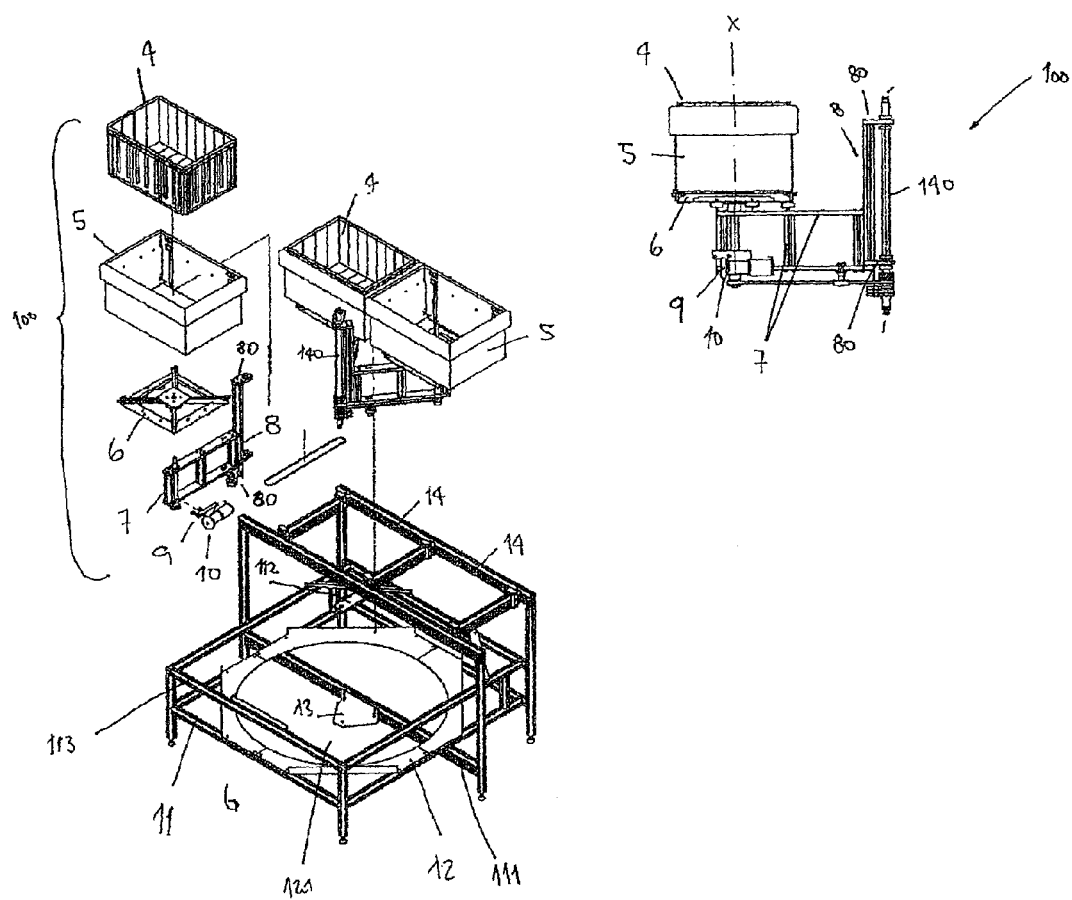
FIG. 3 illustrates the rotating device according to one or more embodiments of the present invention, where some of the device's different elements are depicted in an expanded section.

In FIG. 3 an expanded section of the rotating device 1 is illustrated, where it can be seen that the holding device 5 has to be mounted on the vertical frame 7, here the vertical frame 7 is further connected to the elongated element 8. The vertical frame 7 is driven round by a mechanical device 10 mounted on the vertical frame 7. The mechanical device 10 comprises an electric motor with a wheel 10 resting on the frame 12, where the electric motor drives the holding device 5 in the same relative position while the holding device 5 rotates, i.e. the holding device 5 is permitted to rotate about a vertical axis X extending through the centre of the holding device 5. This arrangement means that the holding device's 5 long sides will be parallel to a transverse beam 113 in the framed structure 11.

Figure 4:
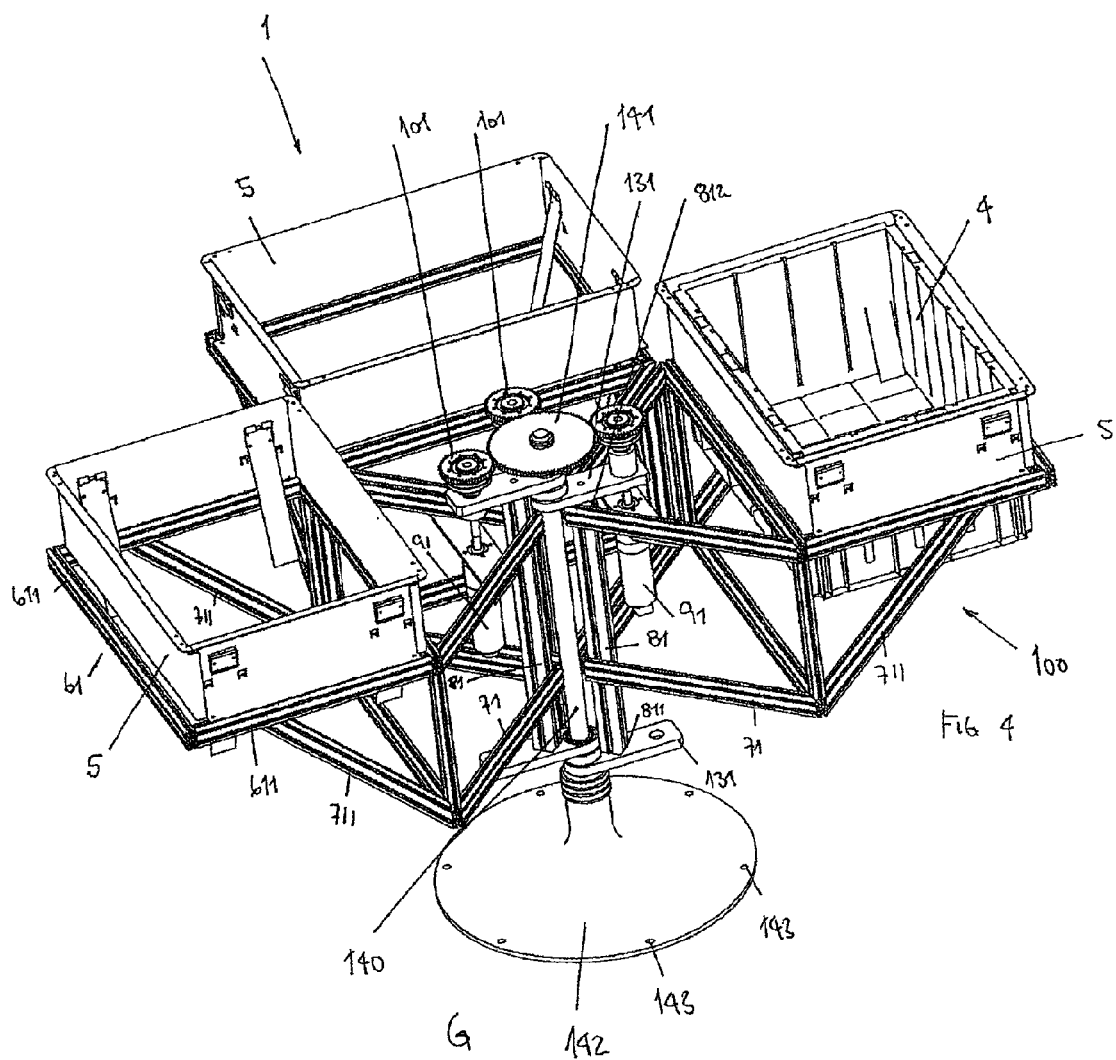
FIG. 4 illustrates further details of the rotating device according to one or more embodiments of the present invention.

In FIG. 4 another embodiment of the rotating device 1 for receiving and handling different goods or products according to one or more embodiments of the present invention is illustrated, where the rotating device 1 is depicted ready-assembled. In this embodiment the rotating device 1 also comprises three holding devices 5, even though it should be understood that the rotating device 1 may comprise a larger or smaller number of holding devices 5.

Each holding device 5 is connected to a holding frame 61, the holding frame 61 being composed of four beams 61 1 which are interconnected. The holding frame 61 is supported by two beams 71 1 extending obliquely up from a triangular frame 71, and is further connected to the one side of the triangular frame 71. The triangular frame 71 is further connected to an elongated element 81. The elongated element's 81 lower and upper ends 811, 812 are each connected to a plate element 131. A drive device 91 is connected in a suitable manner to an upper plate element 131, near one end of the plate element 131. The drive device 91 comprises a gearwheel 101.

The plate elements 13 1 are further mounted in a central stem 140 which is arranged centrally in the rotating device 1. At an upper end of the central stem 140 a sun wheel 140 is mounted, which sun wheel 140 is engaged with the gearwheels 101. A drive device (not shown) is used to drive the sun wheel 140.

A lower end of the central stem 140 is connected to a support 142. Around its circumference the support 142 is provided with a number of through-going holes 143, in order to connect it securely to the base G by means of bolts, screws or the like.

In a similar way to the embodiment according to FIGS. 2 and 3, in this embodiment each holding device 5 is also arranged to be able to be rotated about an axis X extending through the centre of the holding device 5, with the result that the holding devices 5 will assume the position illustrated in FIG. 2.

The rotating device 1 for receiving and handling goods and/or products will be mounted in a work station 2 which is associated with a storage system for different goods and/or products.

Figure 5:
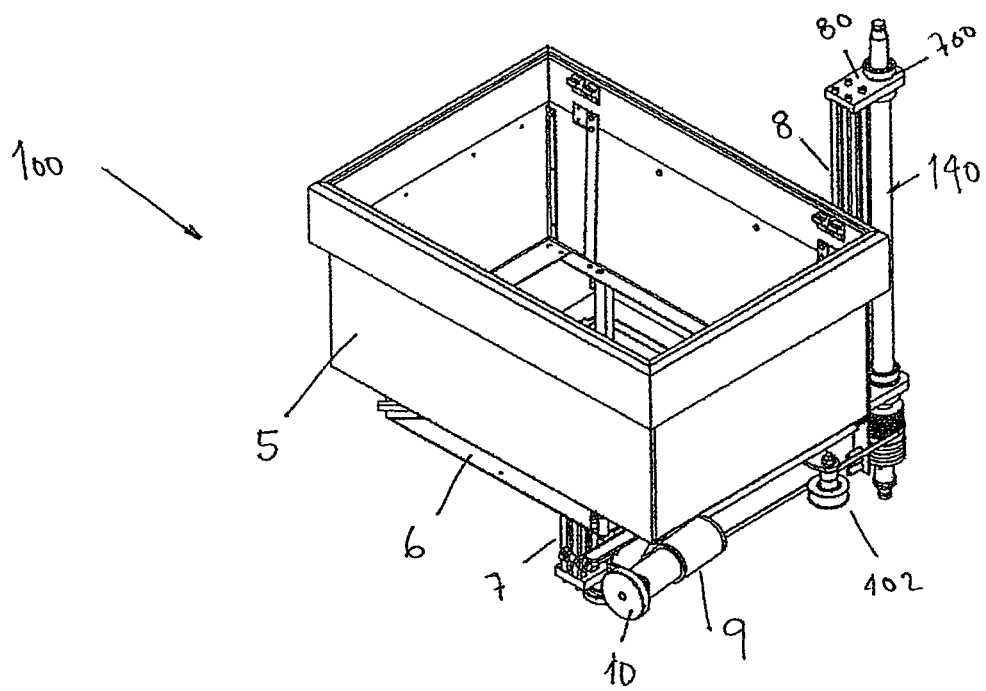
FIG. 5 illustrates a separate unit in the rotating device according to one or more embodiments of the present invention.

In FIG. 5 a separate unit 100 is illustrated (for the sake of simplicity the storage device 4 is not shown in the figure). In this case the holding device 5 will be secured to the holding plate 6 by means of bolts, screws or the like. The holding plate 6 will furthermore be connected to the vertical frame 7 in such a manner that the holding plate 6 can be rotated relative to the vertical frame 7. The vertical frame 7 is further connected to an elongated element 8 comprising an upper and lower mounting bracket 80 (only the upper mounting bracket is shown in the figure), where the upper and lower mounting brackets 80 are provided with a through-going hole 700 for mounting in a central stem 140. The lower end of the central stem 140 is connected to a common drive arrangement (not shown), to which common drive arrangement a drive device 9 mounted on the vertical frame 7 is also connected. In addition the holding plate 6 is also connected to the common drive arrangement by means of a chain-driven drive arrangement 102. By means of this arrangement the common drive arrangement can both drive the drive device 9 and the chain-driven drive arrangement 102, thereby permitting the holding device 5 to rotate relative to the vertical frame 7 by means of the connection with the holding plate 6. The holding device 5 will then be rotated so that the holding device's long sides will at all times be parallel to a transverse beam 113 in the framed structure 11, see also FIG. 3.

The invention has now been explained by means of one or more embodiments. Only elements connected with the invention are described and a person skilled in the art will appreciate that in the present system fewer or more holding devices may be employed in the rotating device, the holding devices may be controlled independently of or dependently on one another etc. The skilled person will also understand that several changes and/or modifications may be made to the described and illustrated embodiments which are within the scope of the invention as defined in the following claims.

The invention claimed is:

1. A rotating device for receiving and handling goods and/or products, the device comprising:
    a plurality of separate units that can be controlled independently,
    wherein each separate unit comprises a storage device, a box-like holding device, a holding plate, and a vertically arranged frame,
    wherein the box-like holding devices receives a corresponding storage device, wherein the box-like holding devices is connected to a corresponding holding plate and the corresponding holding plate is supported by the vertically arranged frame, which is connected to an associated elongated element,
    wherein the elongated elements is connected to a central stem,
    wherein a drive device is associated with a corresponding vertically arranged frame, each drive device is connected to a common drive arrangement that provides a rotation for each holding device about an axis of rotation extending in parallel to the stem,
    wherein the holding plate of each holding devices is connected to the common drive arrangement by a chain-driven drive arrangement, permitting each holding device to rotate relative to the vertically arranged frame about a vertical axis extending through a center of the holding device.

2. The rotating device according to claim 1, wherein the rotating device comprises at least two or more holding devices.

3. The rotating device according to claim 2, wherein the holding device comprises at least one stop and sensor device mounted on an inside, for securing and confirming receipt of a storage device.

4. The rotating device according to claim 1, wherein the rotating device is mounted in a framed structure in a work station.

5. The rotating device according to claim 4, wherein the framed structure comprises a framework.

6. The rotating device according to claim 1, wherein the rotating device comprises a control unit connected to the common drive arrangement.

7. The rotating device according to claim 1, wherein the common drive arrangement comprises at least one electromotor connected to a gearwheel.

8. The rotating device according to claim 1, wherein the holding devices are arranged to be moved independently of one another.

9. The rotating device according to claim 1, wherein the frame comprises a transverse beam which supports the holding frame.

10. A workstation apparatus for receiving and handling goods and/or products, the workstation apparatus comprising:
    a working surface comprising:
    a plurality of separate units that can be controlled independently,
    wherein each separate unit comprises a storage device, a box-like holding device, a holding plate, and a vertically arranged frame,
    wherein the box-like holding devices receives a corresponding storage device, wherein the box-like holding devices is connected to a corresponding holding plate and the corresponding holding plate is supported by the vertically arranged frame, which is connected to an associated elongated element,
    wherein the elongated elements is connected to a central stem,
    wherein a drive device is associated with a corresponding vertically arranged frame, each drive device is connected to a common drive arrangement that provides a rotation for each holding device about an axis of rotation extending in parallel to the stem,
    wherein the holding plate of each holding devices is connected to the common drive arrangement by a chain-driven drive arrangement, permitting each holding devices to rotate relative to the vertically arranged frame about a vertical axis extending through a center of the holding device.

* * * * *